(12) United States Patent
Sakaguchi et al.

(10) Patent No.: US 6,649,106 B2
(45) Date of Patent: Nov. 18, 2003

(54) METHOD FOR DEBINDERING OF POWDER MOLDED BODY

(75) Inventors: Shinji Sakaguchi, Nishikasugai-gun (JP); Shigeki Kato, Nagoya (JP); Takayuki Kawae, Nagoya (JP)

(73) Assignee: NGK Insulators, Ltd. (JP)

( * ) Notice: Subject to any disclaimer, the term of this patent is extended or adjusted under 35 U.S.C. 154(b) by 0 days.

(21) Appl. No.: 10/070,553

(22) PCT Filed: Jul. 4, 2001

(86) PCT No.: PCT/JP01/05782

§ 371 (c)(1),
(2), (4) Date: Mar. 7, 2002

(87) PCT Pub. No.: WO02/10089

PCT Pub. Date: Feb. 7, 2002

(65) Prior Publication Data

US 2002/0182098 A1 Dec. 5, 2002

(30) Foreign Application Priority Data

Jul. 27, 2000 (JP) .......................................... 2000-227269
Mar. 21, 2001 (JP) .......................................... 2001-079702

(51) Int. Cl.$^7$ .......................... B29B 15/00; B29C 71/00
(52) U.S. Cl. ...................... 264/232; 264/233; 264/234; 419/44
(58) Field of Search .............................. 419/44; 264/656, 264/232, 233, 234

(56) References Cited

U.S. PATENT DOCUMENTS

| | | | | |
|---|---|---|---|---|
| 4,713,206 A | | 12/1987 | Matsuhisa et al. ....... 264/328.2 |
| 5,627,258 A | * | 5/1997 | Takayama et al. |
| 5,809,848 A | * | 9/1998 | Viswanadham et al. |
| 2003/0003237 A1 | * | 1/2003 | Seabaugh et al. |

FOREIGN PATENT DOCUMENTS

| | | |
|---|---|---|
| EP | 0 501 602 A2 | 9/1992 |
| JP | 59-27743 | 7/1984 |
| JP | 5-70213 | 3/1993 |
| JP | 5-98308 | 4/1993 |
| JP | 8-133845 | 5/1996 |
| JP | 10-140208 | 5/1998 |
| JP | 10-251705 | 9/1998 |
| JP | 11-256205 | 9/1999 |
| JP | 2000-169242 | 6/2000 |

* cited by examiner

Primary Examiner—Christopher A. Fiorilla
(74) Attorney, Agent, or Firm—Parkhurst & Wendel, L.L.P.

(57) ABSTRACT

A method for debindering of powder molded body, including dipping, in an extracting solution an aqueous surfactant solution, a ceramic powder or metal powder molded body containing a binder with at least two kinds of binder components, to selectively extract and remove at least one kind of binder component from the molded body, and then removing the binder components remaining in the molded body after extraction. This debindering method permits rapid debindering while preventing the generation of defects such as cracks and the like, is highly safe to human health and environment, and requires a low facility cost.

11 Claims, 3 Drawing Sheets

METHOD FOR DEBINDERING OF POWDER MOLDED BODY

This application is a 371 of PCT/JP01/05782 filed Jul. 4, 2001.

TECHNICAL FIELD

The present invention relates to a debindering method used for removing a binder from a powder molded body containing a binder consisting of at least two kinds of binder components.

BACKGROUND ART

When a ceramic powder or metal powder molded body is produced by extrusion, injection or the like, a binder is added into a ceramic powder or a metal powder in order to obtain higher moldability. The binder component used is determined in view of the shape, raw material, molding method, etc. of the molded body to be produced, and it is not rare to use a binder consisting of at least two components.

In producing, for example, a molded body of honeycomb form used in production of, for example, a carrier for exhaust gas purification catalyst or a filter for diesel particulate, there has come to be used a thermoplastic binder which is a mixture of a water-insoluble wax and a thermoplastic resin, in place of a conventional binder which is a water-soluble thermosetting methyl cellulose, because the partition walls of honeycomb structure have become thinner (25 to 100 $\mu$m) and consequently higher fluidity during extrusion and higher shape retainability after extrusion have become necessary.

Such a thermoplastic binder contains no water therein and therefore requires no drying step unlike the case using a water-soluble binder; however, the weight ratio of binder component in molded body is inevitably large. Therefore, a large amount of a binder must be removed from the molded body during the debindering step, and it is an important task to conduct a debindering treatment rapidly without generating any defect in the molded body.

For debindering of molded body, it is generally conducted to heat a molded body to allow the binder in the molded body to vaporize and decompose thermally. This debindering method has been used also in debindering of the above-mentioned molded body of honeycomb form. Meanwhile, a thermoplastic binder has been used in producing a molded body by injection and, for debindering of the produced molded body, a method is known in which part of the binder used is removed by dissolution (extraction) using an organic solvent and then the remaining binder is removed by heating (see JP-B-59-27743).

In the method for debindering of molded body by heating a molded body to allow the binder contained therein, to vaporize and decompose thermally, however, the thermal decomposition of organic binder generates a large amount of a decomposition gas (e.g. $CO_2$) and accordingly gives a large burden to the environment. Further, the abrupt heat generation during the thermal decomposition of binder gives rise to a temperature difference inside the molded body; and the thermal stress caused by this temperature difference, plus the pressure of decomposition gas or the dimensional change caused by decomposition tend to generate defects such as cracks and the like particularly in a molded body of relatively low strength, such as honeycomb molded body of thin partition walls. In order to prevent such defects, it is necessary to slow the temperature elevation during the heating of molded body and make small the heat generation inside the molded body, which makes long the debindering time.

In the method for debindering of molded body by extracting the binder contained in a molded body, with an organic solvent, there is used an organic solvent which gives adverse effects on human health and the environment and which may cause fire; this invites the deterioration of working environmental, reduced safety and an increase in the incidental facility required for emission gas treatment, etc.

The present invention has been made in view of the above-mentioned situation and aims at providing a method for debindering of powder molded body, which enables a short time and rapid debindering treatment while preventing the generation of defects such as cracks and the like, which has high safety to human health and environment, and which requires a low facility cost.

DISCLOSURE OF THE INVENTION

According to the present invention, there is provided a method for debindering of powder molded body, characterized by dipping, in an extracting solution composed of an aqueous surfactant solution, a ceramic powder or metal powder molded body containing a binder comprising at least two kinds of binder components, to selectively extract and remove at least one kind of binder component from the molded body, and then removing the binder components remaining in the molded body after extraction.

In the present invention, it is desirable from the standpoint of preventing the cracks generating during the extraction from the molded body that at least 40% by volume of the binder component to be selectively extracted is extracted and removed before the linear expansion of the molded body during the extraction step reaches 50% relative to the linear expansion of the molded body when no extraction and removal is made. Even if the linear expansion of the molded body during the extraction step is 50% or more relative to the linear expansion of the molded body when no extraction and removal is made, it is desirable to allow the molded body to make uniform expansion from the standpoint of preventing the cracks generating during the extraction from the molded body. It is preferred to selectively extract and remove at least one kind of binder component from the molded body, wash the resulting molded body with water, remove the water remaining in or adhering to the molded body, and then heat the molded body to remove the binder components remaining in the molded body without being extracted by the extracting solution, because this operation makes easy the removal of water from the molded body and prevents the generation of cracks in the molded body during its drying.

BRIEF DESCRIPTION OF THE DRAWINGS

FIGS. 1(a), 1(b) and 1(c) show the cracks generated in the ends of the fired bodys obtained in Example 1, Example 4 and Comparative Example, respectively.

BEST MODE FOR CARRYING OUT THE INVENTION

Figure 1A:
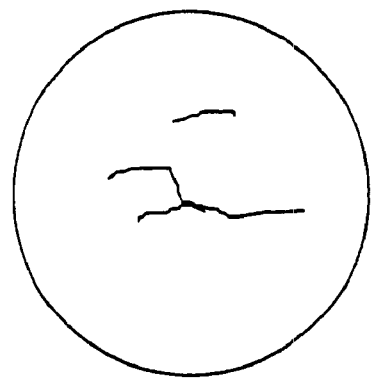
FIGS. 1(a), 1(b) and 1(c) show generation of cracks in the fired bodys obtained in Examples.

In the method for debindering of powder molded body according to the present invention, a ceramic powder or metal powder molded body containing a binder consisting of at least two kinds of binder components is debindered. First, the molded body is dipped in an extracting solution consisting of an aqueous surfactant solution to selectively extract and remove at least one kind of binder component from the molded body while leaving at least one other kind of binder component in the molded body.

By thus selectively extracting and removing at least one kind of binder component from the molded body while leaving at least one other kind of binder component in the molded body, the molded body can keep the required shape even after the extraction owing to the action of the binder component remaining in the molded body and can be free from deformation.

The binder component remaining in the molded body without being extracted by the extracting solution is removed finally by various means such as thermal decomposition, combustion, vaporization, sublimation, chemical decomposition, supercritical fluid extraction and the like. In the present invention, since only the binder component remaining in the molded body without being extracted is removed finally, the amount of the binder removed finally can be made small. As a result, the heat generated or absorbed or amount of decomposition gas generated during the binder removal is small and the dimensional change of the molded body taking place associated with the binder removal is also small; consequently, the damage (e.g. cracks generation) of the molded body is suppressed, the treatment time is short, and the load to environment is small.

Further in the present invention, since the extracting solution for binder is an aqueous surfactant solution, the safety to human health and environment is high and the breakout of fire can be prevented. As a result, the incidental facility required for emission gas treatment, etc. can be made small, resulting in a reduced equipment cost.

However, the selective extraction of the binder from the molded body is conducted at a temperature not lower than the melting point of the binder component to be extracted; hence, during the temperature elevation for conducting the extraction, the binder gives rise to volume expansion and shrinkage and generates a stress, which may generate cracks in the molded body.

It is preferred in the present invention to conduct selective extraction of binder under such a condition that at least 40% by volume of the binder component to be extracted and removed is removed before the linear expansion of the molded body reaches 50% relative to the linear expansion of the molded body when no extraction and removal is made. Such selective extraction can be conducted, for example, by conducting preliminary extraction at a temperature lower than the melting point of the binder component to be extracted, until the binder component is extracted to a predetermined level or more, and thereafter heating the extracting solution (containing the molded body) to a temperature equal to or higher than the melting point of the binder component, to conduct normal extraction. The preliminary extraction can be conducted, for example, by (1) increasing the temperature of the extracting solution (containing the molded body) at a low temperature elevation rate of 20° C./hr or less, or (2) keeping the above extracting solution for a given length of time at a temperature lower than the melting point of the binder component.

By thus using a low temperature elevation rate or keeping the extracting solution at a temperature lower than the melting point of the binder component, the binder component is extracted, the binder amount in the molded body is reduced, and the molded body shows volume expansion owing to its temperature increase. Therefore, the volume expansion of the molded body is small and the stress generated is small as compared with the case when the temperature elevation rate of the extracting solution is not lower than the above-mentioned predetermined level; the binder is partially extracted and removed and the molded body becomes porous; consequently, the stress generated is relaxed, generation of cracks is prevented, and the selective extractability for the binder component is improved.

A study by the present inventor revealed that in the selective extraction of binder from molded body, the molded body undergoes two contradictory actions, i.e. expansion and shrinkage because there take place the expansion of binder and the shrinkage caused by the progress of extraction simultaneously. A further study by the present inventor found out that by conducting slow extraction at a temperature elevation rate (of the extracting solution) of not higher than a predetermined level or by keeping the extracting solution for a predetermined length of time at a temperature lower than the melting temperature of the binder, it is possible to prevent the generation of cracks in the molded body and increase the selective extractability for the binder component. Further in the selective extraction of the binder component, the temperature decrease is preferably conducted slowly because in the temperature decrease, a stress is generated owing to the shrinkage of the residual binder.

In the above (1), the temperature elevation rate of the extracting solution is preferably 10° C./hr or less, particularly preferably 5° C./hr or less. In the above (2), it is desired that the extracting solution is kept for 2 to 6 hours at a temperature lower by 5 to 10° C. than the melting point of the binder component. The temperature decrease rate during the cooling is preferably 80° C./hr or less, more preferably 60° C./hr or less, further preferably 30° C./hr or less.

In the present invention, even when the linear expansion of the molded body caused by the volume expansion of the binder during the extraction is 50% or more relative to the linear expansion of the molded body when no extraction is made, the molded body can be allowed to generate no crack by allowing the expansion to take place uniformly. For example, when the molded body of honeycomb form is dipped directly in the extracting solution of 70° C., the molded body shows a linear expansion of about 2%; in this case, however, since the partition wall thickness of the honeycomb molded body is small and the gap portion of the honeycomb cells is momentarily filled with the extracting solution of 70° C., the honeycomb molded body gives rise to uniform expansion momentarily, resulting in no crack formation. Such an operation is preferred because the extraction time can be shortened significantly.

As mentioned above, an aqueous surfactant solution is used as the extracting solution for binder. As a result, in drying of the molded body conducted after the selective extraction of the binder component from the molded body, the aqueous surfactant solution generates bubbles and these bubbles make difficult or slow the removal of the water remaining in the molded body or adhering to the molded body; further, since the outer surface of the molded body dries quickly, a tensile stress appears and cracks tend to generate. Hence, in the present invention, it is preferred to wash the molded body after selective extraction of binder, with water and then absorb/remove the water remaining in the molded body, with a water-absorbent substance such as paper towel, porous ceramic or the like. Further, in the drying of the molded body obtained, it is preferred to conduct non-circulating drying because when drying is conducted by allowing a gas flow (generated by a circulating fan or the like) to collide with the molded body, the molded body is dried non-uniformly. After the drying of the molded body, the binder components remaining therein are removed, whereby the debindering of molded body is completed.

In the present invention, the binder consists of the component to be extracted and removed from the molded body by the extracting solution and the component to be decomposed and removed by the heat applied. A wax is preferred as the former component and an EVA is preferred as the latter component. When the binder component to be extracted and removed by the extracting solution is a wax, the wax becomes a liquid in the extracting solution when extraction is conducted at a temperature not lower than the melting point of the wax, and easy extraction is possible.

After the extraction, the extracting solution is cooled to around room temperature. Thereby, the extracted wax component solidifies and floats at the top of the extracting solution, and the solidified wax is separated and recovered. Thus, both the extracting solution and the wax can be reutilized. Incidentally, in the extraction, it is preferred to shake the molded body dipped in the extracting solution or move the extracting solution in order to always contact the molded body with a fresh portion of the extracting solution, because such contact can achieve a higher degree of extraction.

The surfactant used in the present invention is preferably any one kind of surfactant selected from the group consisting of nonionic surfactants, anionic surfactants, cationic surfactants and amphoteric surfactants, or a combined surfactant consisting of at least two kinds selected from the above group. In general, surfactants act to an interface between two different substances and reduce the tension of the interface, and have functions of penetrability increase, wettability increase, fluidity increase, emulsification, dispersion and dissolution. In the present invention, the surfactant is presumed to effectively exhibit mainly penetrability increase, wettability increase, emulsification and dispersion.

It is believed that anionic surfactants and nonionic surfactants have the above functions in combination and that cationic surfactants and amphoteric surfactants promote the above functions depending upon the way they are used. Therefore, by appropriately combining at least two kinds of the above surfactants, the resulting extracting solution can have two functions, i.e. a function of penetrating into the interface between the binder and the powder both constituting the molded body and taking out the binder and a function of dispersing the taken-out binder in water, whereby extraction can be conducted more easily.

More specific examples of the surfactants are mentioned. As the amphoteric surfactants, there can be mentioned amine oxide type and alkyl betaine type; as the nonionic surfactants, there can be mentioned alkanolamide type; and as the anionic surfactants, there can be mentioned salts of alkyl ether sulfates and salts of alkyl sulfates. Use of any kind of surfactant selected from these surfactants is preferred because a high degree of debindering can be obtained.

In the present invention, there is no particular restriction as to the kind of the ceramic powder or metal powder constituting the molded body to be debindering. There is no particular restriction, either, as to the dimension or form of the molded body; however, the present debindering method is particularly effective to a molded body of small wall thickness into which the extracting solution can easily penetrate, for example, a molded body of honeycomb form.

The present invention is described in more detail below by way of Examples. However, the present invention is in no way restricted by these Examples.

EXAMPLE 1

To 100% by weight of a ceramic powder were added, as a binder, a wax (54% by weight of a paraffin wax and 8% by weight of a microcrystalline wax) and 35% by weight of an EVA and, as a lubricant, 3% by weight of oleic acid. The resulting mixture was kneaded at 100° C. for 2 hours using a pressure kneader. The kneaded material was molded into a cylinder of 115 (diameter)×200 (length) using a vacuum pug mill. The cylinder was molded into a honeycomb form of 112 (diameter)×180 (length) using a plunger type extruder. The honeycomb form had a wall thickness of 2 mil (51 $\mu$m) and a cell density of 600 cells/in.$^2$ (93 cells/cm$^2$).

Figure 1B:
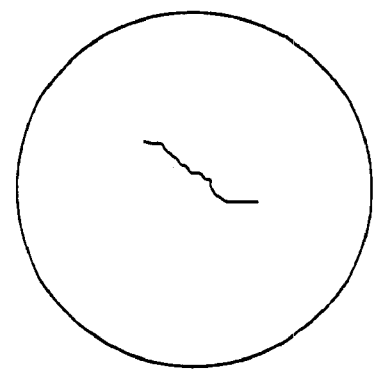
Figure 1C:
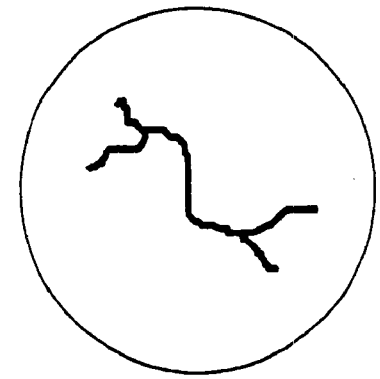

The thus obtained molded body was dipped into an aqueous solution containing 4% of a dihydroxylethylalkylamine oxide. The aqueous solution was heated at a temperature elevation rate of 20° C./hr, kept at 60° C. for 2 hours, then cooled at a cooling rate of 60° C./hr, washed with water, and dried in a dry air of 50° C. to obtain a extraction-debindered body. An analysis of the extracting solution after this operation indicated that only the wax was extracted selectively and 35% of the wax was removed by the extraction. The extraction-debindered body was heated to 400° C. at a temperature elevation rate of 10° C./hr in an atmosphere in which the oxygen concentration was reduced to 10%, to remove the remaining binder components by the heating. The resulting material was fired at 1,430° C. for 4 hours, which generated very small cracks [see FIG. 1(*a*)].

EXAMPLE 2

A molded body obtained in the same manner as in Example 1 was dipped in an aqueous solution containing 10% of lauryldimethylamine oxide, and debindering by extraction was conducted under the same conditions as in Example 1. As a result, 50% of the wax was removed by the extraction. The extraction-debindered body was heated to 400° C. at a temperature elevation rate of 10° C./hr in the atmosphere to remove the remaining binder components by the heating. The resulting material was fired at 1,430° C. for 4 hours, which generated very small cracks.

EXAMPLE 3

An extraction-debindered body obtained in the same manner as in Example 2 was debindered by heating, under the same conditions as in Example 1 and then fired, whereby was obtained a fired body having no crack.

EXAMPLE 4

A molded body obtained in the same manner as in Example 1 was dipped in an aqueous solution containing 2.5% of a dihydroxylethylalkylamine oxide and 5% of coconut oil fatty acid diethanolamide, and debindering by extraction was conducted under the same conditions as in Example 1. As a result, 54% of the wax was removed. The extraction-debindered body obtained was fired under the same conditions as in Example 2, which generated very small cracks [see FIG. 1(*b*)].

EXAMPLE 5

An extraction-debindered body obtained in the same manner as in Example 4 was debindered by heating, under the same conditions as in Example 1 and then fired, whereby was obtained a fired body having no crack.

EXAMPLE 6

A molded body obtained in the same manner as in Example 1 was dipped in an aqueous solution containing 7.5% of dimethyllaurylamine oxide and 2.5% of an alkylalkanolamide, and debindering by extraction was conducted under the same conditions as in Example 1. As a result, 65% of the wax was removed. The extraction-debindered body obtained was fired under the same conditions as in Example 2, which generated very small cracks.

EXAMPLE 7

An extraction-debindered body obtained in the same manner as in Example 6 was debindered by heating, under the same conditions as in Example 1 and then fired, whereby was obtained a fired body having no crack.

EXAMPLE 8

A molded body obtained in the same manner as in Example 1 was dipped in an aqueous solution containing 6% of ammonium salt of lauryl sulfate, 2.5% of dimethyllaurylamine oxide and 1.5% of an alkylalkanolamide, and debindering by extraction was conducted under the same conditions as in Example 1. As a result, 80% of the wax was removed. The extraction-debindered body obtained was debindered by heating and fired under the same conditions as in Example 2, whereby was obtained a fired body having no crack.

EXAMPLE 9

A molded body obtained in the same manner as in Example 1 was dipped in an aqueous solution containing 2.5% of dimethyllaurylamine oxide and 7.5% of ammonium salt of lauryl sulfate. The temperature of the aqueous solution was increased at a temperature elevation rate of 20° C./hr; the aqueous solution was kept at 70° C. for 2 hours and then cooled at a cooling rate of 60° C./hr; the resulting molded body was washed with water and dried to obtain an extraction-debindered body. Almost 100% of the wax was removed by the extraction. The extraction-debindered body was debindered by heating and fired, under the same conditions as in Example 2, whereby was obtained a molded body having no crack.

EXAMPLE 10

An extraction-debindered body obtained in the same manner as in Example 9 was heated to 400° C. in the atmosphere at a temperature elevation rate of 30° C./hr to remove the remaining binder components by the heating. The resulting molded body was fired at 1,430° C. for 4 hours to obtain a fired body having no crack.

COMPARATIVE EXAMPLE

A molded body obtained in the same manner as in Example 1 was heated at a temperature elevation rate of 10° C./hr in an atmosphere in which the oxygen concentration was reduced to 10%, to conduct debindering by heating (no extraction was conducted). The resulting material was fired at 1,430° C. for 4 hours, which generated large cracks [see FIG. 1(c)].

EXAMPLE 11

A molded honeycomb material of 112 (diameter)×180 (length) was obtained in the same manner as in Example 1. The molded honeycomb material had a wall thickness of 2 mil (51 µm) and a cell density of 600 cells/in.$^2$ (93 cells/cm$^2$). The molded body was dipped in an aqueous solution containing 2.5% of dimethyllaurylamine oxide and 7.5% of ammonium salt of lauryl sulfate. The temperature of the aqueous solution was increased at a temperature elevation rate of 5° C./hr; the aqueous solution was kept at 70° C. for 2 hours and cooled at a cooling rate of 60° C./hr; and the molded body was washed with water. The resulting molded body was placed on a paper towel to absorb and remove the water remaining in the molded body, and then dried in a dryer having no circulation fan. The drying was conducted in a windless state in the above dryer by increasing the temperature of the molded body at a temperature elevation rate of 10° C./hr and then keeping the molded body at 50° C. for 16 hours, whereby was obtained an extraction-debindered body. An analysis of the extracting solution after extraction indicated that only the wax was extracted selectively, and the total amount (100%) of the wax was removed by the extraction. The extraction-debindered body was heated to 400° C. at a temperature elevation rate of 10° C./hr in the atmosphere to remove the remaining binder components by the heating, and then fired at 1,430° C. for 4 hours. As a result, a fired body having no crack was obtained.

TABLE 1-1

| Surfactant | Example 1 Dihydroxyethyl-alkylamine oxide | Example 2 Lauryldimethyl-amine oxide | Example 3 Same as left | Example 4 Dihydroxyethyl-alkylamine oxide/coconut oil fatty acid diethanolamide | Example Same as left | Example Dimethyllauryl-amine oxide/alkyl-alkanolamide |
|---|---|---|---|---|---|---|
| Extraction temp. (° C.) | 60 | 60 | 60 | 60 | 60 | 60 |
| Temp. elevation rate During extraction (° C./hr) | 20 | 20 | 20 | 20 | 20 | 20 |
| Cooling rate during Extraction (° C./hr) | 60 | 60 | 20 | 60 | 60 | 60 |
| Degree of extraction (%) *1 | 35 | 50 | 50 | 54 | 54 | 65 |
| Extraction yield (%) | 20 | 40 | 60 | 40 | 40 | 60 |
| Temp. elevation rate During heat debindering (° C./hr) | 10 | 10 | 10 | 10 | 10 | 10 |
| Debindering atmosphere | O$_2$ 10% | Air | O$_2$ 10% | air | O$_2$ 10% | air |
| Cracks in fired body *2 | Δ | Δ | ○ | Δ | ○ | Δ |

TABLE 1-1-continued

TABLE 1-2

| Surfactant | Example 7 Same as in Example 6 | Example 8 Dimethyllauryl-amine oxide/ammonium salt of lauryl sulfate/alkyl-alkanolamide | Example 9 Dimethyllauryl-amine oxide/ammonium salt of lauryl sulfate | Example 10 Same as left | Example 11 Dimethyllauryl-amine oxide/ammonium salt of lauryl sulfate | Comp. Example |
|---|---|---|---|---|---|---|
| Extraction temp. (° C.) | 60 | 60 | 70 | 70 | 70 | — |
| Temp. elevation rate During extraction (° C./hr) | 20 | 20 | 20 | 20 | 5 | — |
| Cooling rate during Extraction (° C./hr) | 60 | 60 | 60 | 70 | 60 | — |
| Degree of extraction (%) *1 | 65 | 80 | 100 | 100 | 100 | 0 |
| Extraction yield (%) | 60 | 80 | 80 | 80 | 100 | — |
| Temp. elevation rate During heat debindering (° C./hr) | 10 | 10 | 10 | 30 | 10 | 10 |
| Debindering atmosphere | $O_2$ 10% | Air | air | air | air | $O_2$ 10% |
| Cracks in fired body *2 | ○ | ○ | ○ | ○ | ○ | x |

*1: weight relative to wax
*2: ○: No crack, Δ: Very small cracks, x: Large cracks
Firing was conducted on samples showing no crack during extraction.

Table 1 shows the results of Examples 1 to 11 and Comparative Example. As seen from the results, cracks are less likely to appear in Examples 1 to 11 where binder removal was conducted using extraction debindering and heat debindering in combination, than in Comparative Example where binder removal was conducted using heat debindering alone. Further, use of appropriately combined surfactants can increase the degree of extraction, and a higher degree of extraction gives less and smaller cracks.

As seen from the results of Examples 2–3 and Examples 9–10, when the degree of extraction for binder is low and extraction is insufficient, a cooling rate larger than a certain level gives increased cracks; and as seen from the results of Examples 9–10 and Example 11, a temperature elevation rate (during extraction) smaller than a certain level prevents generation of cracks. Incidentally, even at a low degree of extraction, control of oxygen concentration can prevent rapid combustion of binder and generation of cracks.

EXAMPLE 12

Figure 2:
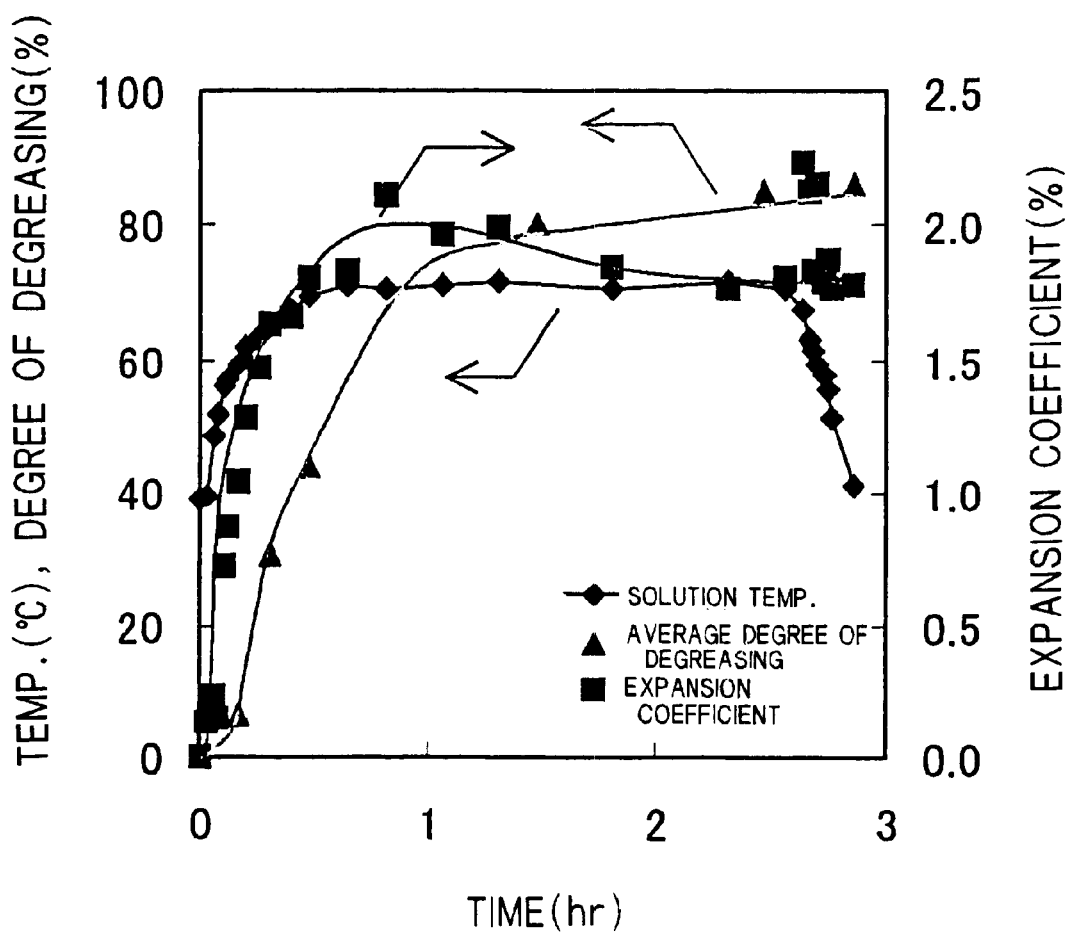
FIG. 2 shows the temperature of an aqueous solution and the degree of debindering and expansion coefficient of a molded body when the molded body was dipped in the aqueous solution and the solution was subjected to rapid temperature elevation.
Figure 3:
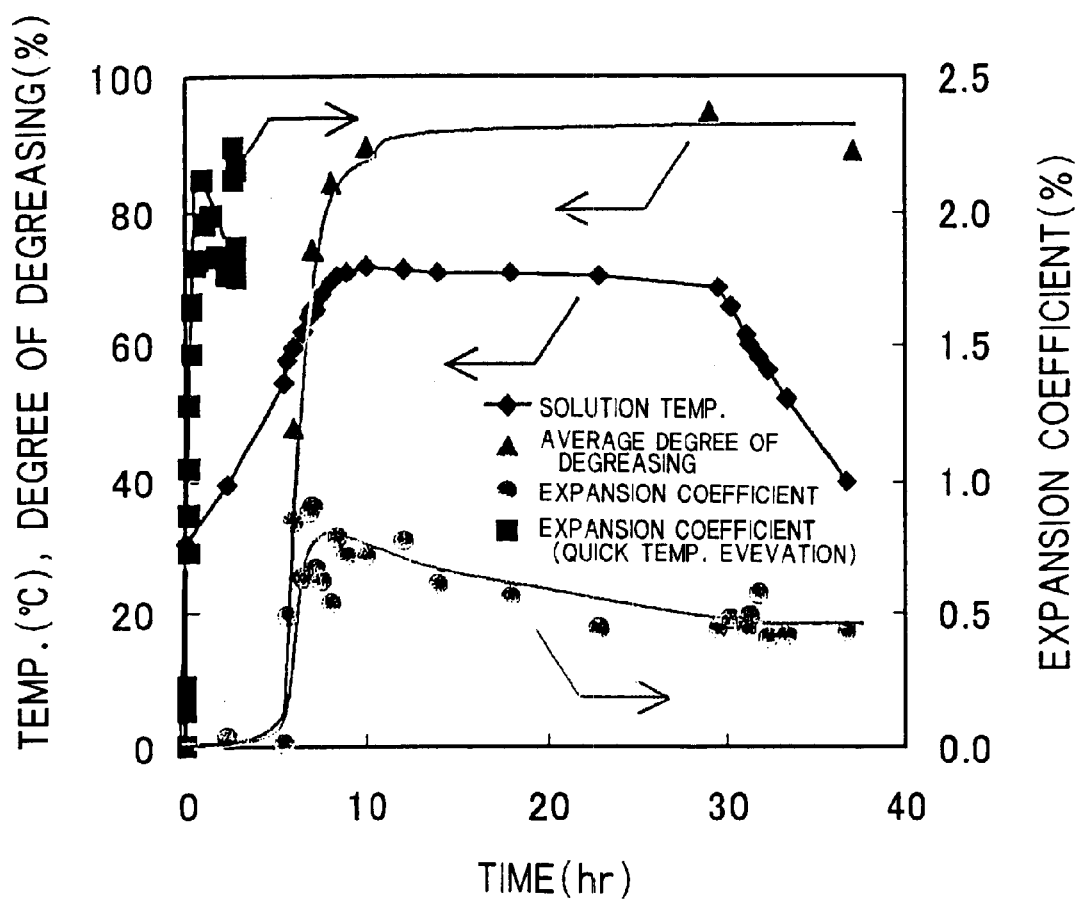
FIG. 3 shows the temperature of an aqueous solution and the degree of debindering and expansion coefficient of a molded body when the molded body was dipped in the aqueous solution and the solution was subjected to slow temperature elevation.

A molded honeycomb material of 112 (diameter)×180 (length) having the same wall thickness and cell density as in Example 1, obtained in the same manner as in Example 1 was dipped in an aqueous solution containing 2.5% of dimethyllaurylamine oxide and 7.5% of ammonium salt of lauryl sulfate. The temperature of the aqueous solution was increased at a small temperature elevation rate of 5° C./hr or at a large temperature elevation rate of 60° C./hr, after which the solution was kept at 70° C. for 2 hours and then cooled at a cooling rate of 60° C./hr. In FIGS. 2 and 3 are shown the temperature of aqueous solution and the degree of debindering and expansion coefficient of molded body, all recorded in the above operation.

As appreciated from FIGS. 2 and 3, when a small temperature elevation rate of 5° C./hr is employed, as compared with when a large temperature elevation rate of 60° C./hr is employed, extraction proceeds while the expansion of molded body is being kept low.

INDUSTRIAL APPLICABILITY

As explained above, the debindering method of the present invention enables a short time and rapid debindering treatment while suppressing the generation of defects such as cracks and the like. Further, the present debindering method has high safety to human health and environment and requires a low facility cost.

What is claimed is:

1. A method for debindering a powder molded body, the method comprising:

dipping, in an extracting solution comprising an aqueous surfactant solution, a ceramic powder or metal powder molded body containing a binder comprising at least two kinds of binder components, selectively to extract and remove at least 40% by volume of at least one kind of binder component from the molded body before linear expansion of the molded body reaches 50% relative to linear expansion of the molded body when no extraction and removal takes place, and then removing the binder components remaining in the molded body after extraction.

2. A method for debindering a powder molded body according to claims 1, wherein the molded body is allowed to expand uniformly during the extraction step.

3. A method for debindering a powder molded body according to claim 1, comprising:

selectively extracting and removing at least one kind of binder component while leaving at least one other kind of binder component in the molded body, washing the resulting molded body with water, removing the water remaining in or adhering to the molded body, and then heating the molded body to decompose and remove the binder components remaining in the molded body without being extracted by the extracting solution.

4. A method for debindering a powder molded body according to claim 1, wherein the binder component extracted and removed by the extracting solution is a wax and the binder component decomposed and removed by the heating is a resin.

5. A method for debindering a powder molded body according to claim 1, wherein the surfactant is a surfactant selected from the group consisting of nonionic surfactants, anionic surfactants, cationic surfactants, and amphoteric surfactants, or mixtures thereof.

6. A method for debindering a powder molded body according to claim 5, wherein the surfactant is a surfactant selected from the group consisting of amine oxide surfactant, alkyl betaine surfactant, alkanolamide surfactant, alkyl ether sulfate salt surfactant, and alkyl sulfate salt surfactant.

7. A method for debindering a powder molded body according to claim 1, wherein the binder component extracted and removed by the extracting solution is a wax and the extraction is conducted at a temperature not lower than the melting point of the wax.

8. A method for debindering a powder molded body according to claim 1, wherein the extraction is conducted by shaking the molded body dipped in the extracting solution, or moving the extracting solution.

9. A method for debindering a powder molded body according to claim 1, wherein the molded body has a honeycomb form.

10. A method for debindering a powder molded body according to claim , wherein a temperature of the extracting solution containing the molded body is increased at an elevation rate that does not exceed 20° C./hr.

11. A method for debindering a powder molded body according to claim 1, wherein a temperature of the extracting solution is maintained at a temperature lower than the melting point of the binder component.

* * * * *